United States Patent
Goyal et al.

(10) Patent No.: US 8,712,384 B1
(45) Date of Patent: Apr. 29, 2014

(54) METHOD AND SYSTEM FOR TRIGGERING MESSAGE WAITING INDICATOR DELIVERY

(75) Inventors: Anoop K. Goyal, Overland Park, KS (US); Bhagwan Khanka, Lenexa, KS (US); Hemanth Balaji Pawar, Herndon, VA (US); Shilpa Kowdley Srinivas, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 641 days.

(21) Appl. No.: 12/198,317

(22) Filed: Aug. 26, 2008

(51) Int. Cl.
*H04M 11/10* (2006.01)
*H04M 3/493* (2006.01)
*H04M 11/00* (2006.01)
*H04M 1/64* (2006.01)

(52) U.S. Cl.
USPC .................... 455/413; 455/412.2; 379/88.18; 379/88.22

(58) Field of Classification Search
USPC ................. 455/412.1, 412.2, 413; 379/88.18, 379/88.22
See application file for complete search history.

(56) References Cited

U.S. PATENT DOCUMENTS

| 6,026,156 | A * | 2/2000 | Epler et al. ............... 379/215.01 |
| 7,409,204 | B2 * | 8/2008 | Chaudry et al. .............. 455/413 |
| 7,764,770 | B2 * | 7/2010 | Kleinfelter et al. ......... 379/88.12 |
| 8,116,744 | B1 * | 2/2012 | Mikan et al. .................. 455/413 |
| 2005/0100143 | A1 * | 5/2005 | Bedingfield, Sr. ......... 379/88.12 |
| 2007/0297373 | A1 * | 12/2007 | Saifullah et al. .............. 370/338 |
| 2008/0247521 | A1 * | 10/2008 | Bi et al. ..................... 379/88.18 |
| 2009/0080622 | A1 * | 3/2009 | Koulagi ..................... 379/27.01 |
| 2010/0159886 | A1 * | 6/2010 | Sigmund et al. ........... 455/412.2 |
| 2010/0159889 | A1 * | 6/2010 | Sigmund et al. .............. 455/413 |

* cited by examiner

*Primary Examiner* — Christopher M Brandt (57) ABSTRACT

Methods and systems for triggering the delivery of a message waiting indicator (MWI) are introduced. In a wireless communication network, a radio access network (RAN) determines that a wireless communication device (WCD), such as a mobile phone, has missed an incoming call, and responsively: (i) routes the incoming call to a message storage system to enable an originator of the call to leave a message for a user of the WCD, (ii) waits a period of time after routing the incoming call to the message storage system, and (iii) then generates and transmits a message waiting query to the message storage system without prompting from the WCD. In response to the message waiting query, the message storage system may transmit a signal indicative of the message to the RAN. Responsively, the RAN may then transmit to the WCD a message waiting indication (MWI) indicative of the message, for presentation of the MWI to the user of the WCD.

19 Claims, 5 Drawing Sheets

METHOD AND SYSTEM FOR TRIGGERING MESSAGE WAITING INDICATOR DELIVERY

BACKGROUND

In a wireless communication system, a radio access network (RAN) usually comprises at least one mobile switching center (MSC), base station controller (BSC), and base transceiver system (BTS). Each BTS may radiate to define wireless coverage areas that serve wireless communication devices (WCDs) such as cell phones.

Many users of wireless communication systems subscribe to voicemail services. When a callee does not answer an incoming call, a voicemail service allows the caller to leave a message for the callee. The callee may not answer the incoming call for various reasons. The callee's WCD may be turned off, or it may be out of wireless coverage. Alternatively, the WCD may on and within a wireless coverage area, but the callee may not answer the incoming call because the callee is not aware of an incoming call indication (such as a ring tone), or chooses to ignore the incoming call indication (e.g., the callee is on another call).

Regardless of the reason, when a callee who subscribes to a voicemail service misses a call, the caller will be directed to a voicemail storage system. Typically, after listening to a short prompt, the caller has the opportunity to leave a message for the callee on the voicemail storage system. If the caller leaves a voicemail message, the callee may later retrieve and listen to the message.

Most wireless communication systems provide a notification to the callee's WCD when such a message is left for the callee. This notification may take the form of a message waiting indicator (MWI). The MWI may indicate that there is at least one voicemail message waiting for the callee. Upon receiving an MWI, the callee's WCD may react accordingly, such as emitting a sound, vibrating, or causing a light on the WCD to glow or to flash on and off.

However, in some cases, the MWI may not be properly delivered to the callee's WCD. This can happen for many reasons, including the voicemail system being overloaded, network congestion causing the MWI to be lost, or the MWI being delivered to a RAN other than the RAN serving the WCD. In these cases, the callee's WCD will not be able to immediately notify the callee that there is a voicemail left for the callee. The callee may be notified of the voicemail at some later point, such as when the callee's WCD re-registers with the same or a different RAN, or when another voicemail is left for the callee, and then an associated MWI is successfully delivered to the callee's WCD. However, the callee may have to wait minutes, hours, or even days for this subsequent notification to arrive. In the mean time, the callee may be unaware that there is a potentially urgent voicemail message waiting on the voicemail storage system.

Overview

In order to improve the delivery of MWIs to WCDs, methods and systems for triggering MWI delivery are introduced. In an embodiment, the RAN serving a WCD determines that the WCD has missed an incoming call. Responsively, the RAN routes the incoming call to a message storage system, such as a voicemail storage system. After optionally waiting a pre-defined period of time without detecting an MWI being transmitted to the WCD and without being prompted by the WCD, the RAN generates a message waiting query and transmits the message waiting query to the message storage system. If the message storage system is holding a message for the WCD, the message storage system may transmit a signal to the RAN in response to the message waiting query. The signal may be an MWI or another type of indication.

Upon receiving the signal, if the RAN determines that the signal is an MWI, the RAN may forward the MWI to the WCD. Alternatively, if the RAN determines that the signal is not an MWI, but otherwise indicates that there is a message waiting for the WCD, the RAN may generate an appropriate MWI and forward this generated MWI to the WCD.

In both cases, the MWI may be transported to the WCD in a page request message. Preferably, the RAN stores two sets of parameters associated with the retransmission semantics of page request messages. If the RAN generates the page request message to transport an MWI, the RAN preferably uses the first set of parameters. On the other hand, if the RAN generates the page request message for purposes other than to transport an MWI (for instance, to notify the WCD of an incoming call), the RAN preferably uses the second set of parameters.

Both sets of parameters may include a timeout parameter and a maximum transmissions parameter. After transmitting a page request message to a WCD, the RAN preferably waits a period of time defined by the timeout parameter. In the case that the WCD fails to respond to a page request message during this period of time, the RAN may retransmit the page request message. The number of times the RAN transmits the page request message may be determined by the maximum transmissions parameter. Once the RAN has transmitted a page request message a number of times equal to the maximum transmission parameter, the RAN preferably stops attempting to transmit the page request message.

By supporting two sets of parameters governing page request message timeout and maximum transmissions values, the RAN can be configured to transmit page request messages for the purpose of transporting an MWI differently from page request messages transmitted for another purpose. Thus, a service provider that operates the RAN can adjust these parameters so that successful delivery of an MWI is more likely or is more efficient, without modifying the general paging behavior of the RAN.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

Disclosed herein are methods and systems for triggering the delivery of a message waiting indicator. For purposes of illustration, the discussion below is directed to a Code Division Multiple Access (CDMA) RAN. It should be understood that any teachings herein may apply to other types of RANs and this illustration should not be construed as limiting the scope of the invention. Furthermore, this illustration is not limited to CDMA RANs, or any specific RAN configuration.

I. Network Architecture

Figure 1:
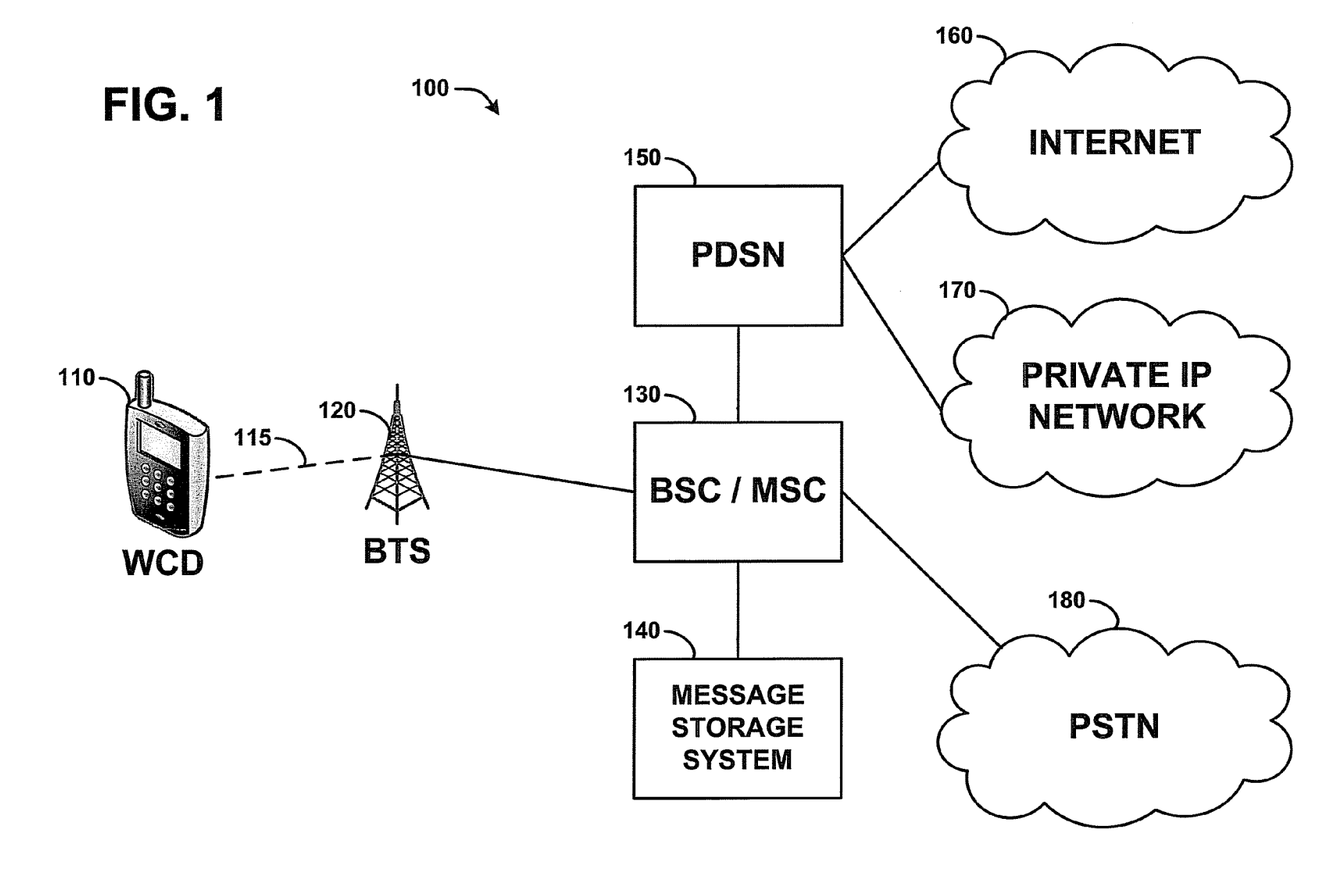
FIG. 1 depicts a block diagram of a communication network in accordance with an exemplary embodiment.

FIG. 1 is a simplified block diagram of an exemplary communication network 100, in which exemplary embodiments may be employed. Network 100 includes one or more WCDs 110, BTSs 120, base station controllers/mobile switching centers (BSC/MSC) 130, message storage systems 140, and packet data serving nodes (PDSNs) 150. BSC/MSC 130 may be coupled with a public switched telephone network (PSTN) 180. Furthermore, PDSN 150 may be coupled with an Internet 160 and at least one private Internet Protocol (IP) network 170.

The combination of network elements, including BTS 120 and BSC/MSC 130, may be collectively referred to as a RAN. The combination of network elements, including message storage system 140 and PDSN 150, may be collectively referred to as core network elements. However, message storage system 140 and PDSN 150 may be co-located with a RAN or combined into elements of a RAN. Furthermore, the elements of a RAN itself may be combined together or separated into fewer or more logically distinct or physically distinct elements than shown in FIG. 1. For example, BTS 120 may be combined into BSC/MSC 130, or BSC/MSC 130 may be separated into distinct BSC and MSC elements. Additionally, message storage system 140 may be hosted on Internet 160 or private IP network 170 by an operator of the RAN or by a third party.

Regardless of the exact configuration of the elements in FIG. 1, the general purpose of these elements is to allow WCD 110 to participate in circuit-switched and packet-switched communications. Circuit-switched calls, such as those enabling traditional voice telephony services, may involve BSC 120 and BSC/MSC 130, and are preferably routed to PSTN 180. Packet-switched calls, also known as data calls, enable various communication services, such as voice over IP (VoIP), video over IP, push-to-talk (PTT), audio and video streaming, web surfing, as well as other types of IP services. These calls may involve BTS 120, BSC/MSC 130, and PDSN 150, and are preferably routed on to either Internet 160, private IP network 170, or both.

Communication network 100 may include more or fewer elements than shown in FIG. 1, and these elements may be arranged differently. Also, each of these elements may include at a central processing unit (CPU), a memory, input/output peripherals, and a wireline or wireless network interface. The characteristics and functions of each of these elements are described at a high level in the following subsections. However, the descriptions in these subsections are merely introductory and should not be interpreted to limit the characteristics and functions of these elements.

a. BTS

BTS 120 radiates to define wireless coverage areas. Each wireless coverage area may provide air interface access to WCD 110 and any other WCD served by the wireless coverage area. A single BTS may define one or more wireless coverage areas. The air interface 115 of these wireless coverage areas may include forward links for transmitting information from BTS 120 to WCD 110 (in the forward direction) and reverse links for transmitting information from WCD 110 to BTS 120 (in the reverse direction). Through the forward and reverse links, BTS 120 and WCD 110 exchange signaling traffic, as well as bearer traffic, such as voice, data, video, or other media. Although FIG. 1 shows only one BTS 120, network 100 may include more BTSs.

b. WCD

WCD 110 could be a wireless telephone, a wireless personal digital assistant, a wirelessly equipped laptop computer, a wireless router, or another type of mobile or fixed wireless device. Preferably, a WCD is a subscriber device, which is manipulated by a human in order to establish circuit-switched or packet-switched voice and/or data calls into the RAN and core network. However WCD 110 could also be an automated device without a human interface. Typically, WCD 110 is associated with one or more BTSs 120 at a time and uses the wireless coverage areas of these BTSs to communicate with correspondent nodes, such as web servers, gaming servers, VoIP signaling proxies, VoIP bearer gateways, and other WCDs. WCD 110 may also be able to transfer ongoing communication sessions from one BTS 120 to another in a handoff process.

WCD 110 may retrieve and/or listen to messages stored for it in message storage system 140 autonomously, in response to receiving an MWI, or upon user request. Typically, a WCD has a function built into its user interface facilitating a user's ability to efficiently access messages. Alternatively, WCD 110 may automatically download any messages on message storage system 140, and/or store a local copy of the messages for the user's convenience.

c. BSC/MSC

BSC/MSC 130 comprises two logical elements, a BSC and an MSC, which are combined in FIG. 1 for purposes of simplicity. In a deployment of network 100, the BSC and MSC may be separate physical devices or may be software or hardware components on the same physical device.

A BSC portion of BSC/MSC 130 may control multiple BTSs 120 by determining how each BTS 120 manages the WCDs 110 in the BTS's wireless coverage areas. For example, a BSC may instruct a BTS 120 to assign wireless channels to WCD 110, increase or decrease power to WCD 110, or handoff WCD 110 to a different BTS 120. Voice and data traffic to and from each WCD 110 typically flows through a BSC. Preferably, the BSC routes circuit-switched communications to an MSC element, and packet-switched communications to PDSN 150.

An MSC portion of BSC/MSC 130 performs many of the functions of a Class 5 telephony switch, but with additional functionality to manage the mobility of subscriber devices, such as WCD 110. For example, an MSC may comprise a visitor location register (VLR) and a home location register (HLR). Alternatively, the VLR and HLR functions may be located in a more centralized fashion and not associated solely with any one MSC. The MSC may be responsible for switching functions, media transport functions, transcoding functions, short message service (SMS) functions, and managing the communications between WCD 110 and the PSTN 180.

In a preferred arrangement, a wireless network comprises multiple MSCs. Each WCD that subscribes to the wireless network is assigned to a home MSC. An HLR may maintain a profile for the WCD. When the WCD roams to a wireless coverage area managed by a different MSC, the WCD is considered to be roaming to a visited MSC. Accordingly, a VLR, which may be associated with the visited MSC, may acquired a copy of the WCD's profile from the HLR. Alternatively, the VLR may acquire a copy of only a subset of the WCD's profile or a reference to the WCD's profile at the HLR.

d. PDSN

A PDSN 150 may be a router-like device that manages the connectivity of WCD 110 to a packet-switched network. A PDSN 150 preferably serves tens, hundreds or thousands of WCDs via point to point protocol (PPP) links to each WCD. However, a PPP link to a WCD is not required for a PDSN 150 to serve a WCD. A PDSN 150 may also authenticate WCDs, or, in conjunction with a AAA server (not shown), facilitate authentication of WCDs. Once a WCD, such as WCD 110, is authenticated, its serving PDSN 150 will grant the WCD access to Internet 160 and/or public IP network 170.

e. Message Storage System

Message storage system 140 is a network element that answers an incoming call for WCD 110, and may record a message for that WCD. A common example of a message storage system is a voicemail server, but other types of message storage systems, such video-mail servers, and push-to-talk-mail servers, are possible.

Message storage system 140 answers an incoming call that was missed by an intended recipient WCD. This recipient may have not answered the call quickly enough, or may have intentionally left the incoming call unanswered. In either case, an RAN element, preferably an MSC, determines that the WCD missed the incoming call and routes the missed incoming call to message storage system 140. Preferably, the caller is then prompted by at least an audible announcement or tone to leave a message. Message storage system 140 then records and stores the message, associating the message with the WCD.

Typically, in response to or upon completion of recording the message, message storage system 140 transmits a signal into the RAN. The signal preferably indicates that there is a message waiting for the WCD. This signal may be an MWI, and it may identify the WCD. The MWI may also include more detail, such as the number of messages waiting for the WCD, some information about each message, such as the caller, the time that the message was left, the message's length, as well as other data. Alternatively, the signal may be a Boolean indication that the message storage system 140 is storing a message for the WCD.

If the WCD is roaming, message storage system 140 may transmit the signal directly to the WCD's visited MSC. Alternatively, message storage system 140 may transmit the signal first to the WCD's home MSC, and the WCD's home MSC may determine, preferably via its HLR, that the WCD is roaming to a visited MSC. Then, the WCD's home MSC may forward a copy of the signal to the visited (serving) MSC.

In addition to transmitting a signal upon the receipt of a message, message storage system 140 may be arranged to also transmit the signal in response to a message waiting query. For example, the RAN may query the voicemail storage system on behalf of a specific WCD, and message storage system 140 may respond by transmitting the signal to the RAN, even if the voicemail storage system has already transmitted the signal to the RAN or another network device or system one or more times.

Message storage system 140 may be implemented on a general purpose computer, as an embedded system, or using a myriad of other hardware, software and/or firmware techniques and devices. The messages stored in the message storage system 140 may be recorded on volatile or non-volatile memory, such as semiconductor memory, magnetic memory, optical memory, acoustic memory, biological memory, or any combination of these memory technologies, or any other memory technology used in conjunction with computational devices.

II. Example Call Flow

The following embodiment involves a WCD, such as WCD 110, RAN network elements, and core network elements. The RAN determines that the WCD has missed a call, but that message storage device 140 may not have transmitted an MWI to the WCD. In response to this determination, the RAN proactively transmits a message waiting query to message storage device 140, thus triggering message storage device 140 to transmit a signal indicative of the MWI to the RAN. The RAN may then forward this signal to WCD 110, or the signal may cause the RAN to generate and send an MWI to WCD 110. If the signal transmitted by message storage device 140 indicates that there are no new messages stored for WCD 110, the RAN preferably does not forward the signal to WCD 110.

Figure 2:
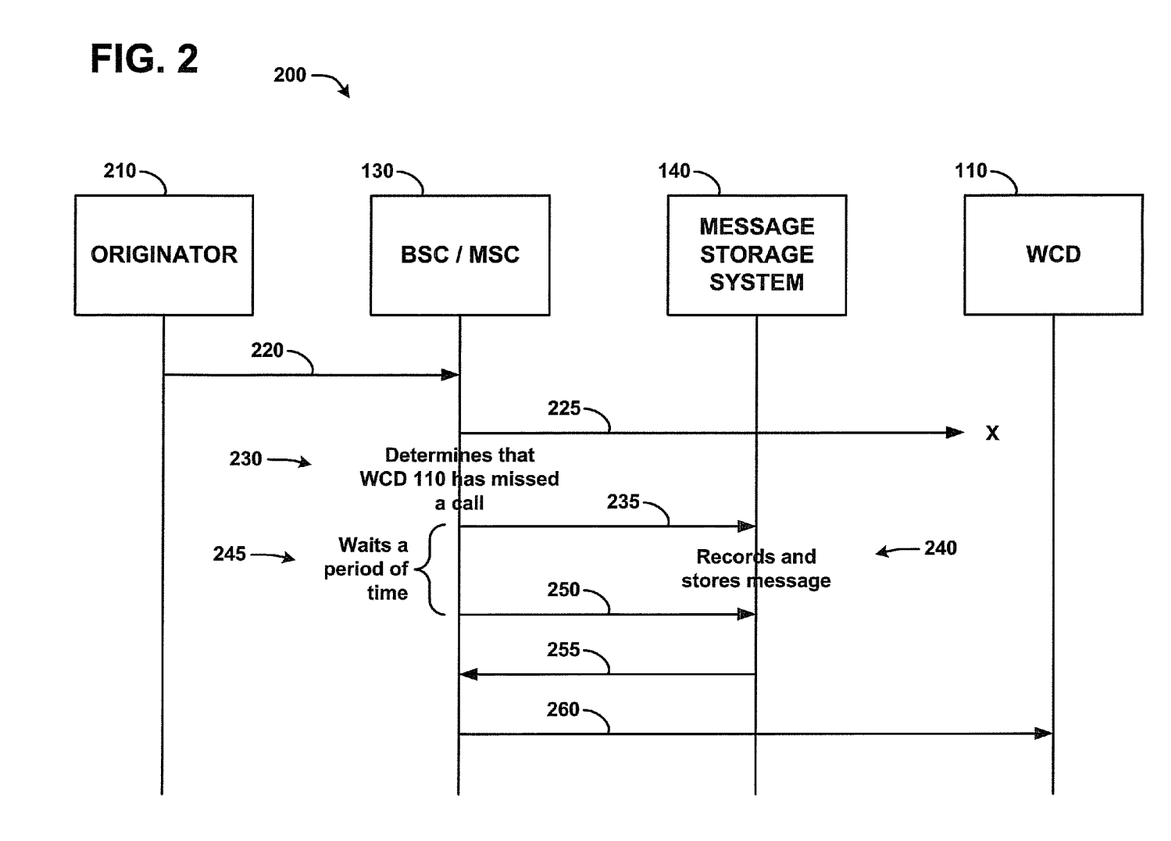
FIG. 2 depicts a call flow of a RAN element forwarding a missed call to a message storage system, a message being left in the message storage system, and the RAN element subsequently triggering the transmission of an MWI to the intended recipient of the message.

To illustrate this embodiment, an example call flow 200 is shown in FIG. 2. Originator 210 calls WCD 110. Originator 210 may be a wireless or wireline communication device. The call may be a voice call, either circuit-switched or packet-switched, or a type of multi-media call, including some combination of voice, video, and possibly other media. Accordingly, at step 220, an incoming call is forwarded to BSC/MSC 130. Alternatively, the incoming call may be forwarded to some other RAN element which is also capable of performing the steps attributed below to BSC/MSC 130. At step 225, BSC/MSC 130 routes the incoming call to WCD 110. However, WCD 110 does not answer the call.

WCD 110 may miss the call for many reasons. It is possible that, as is shown in call flow 200, the incoming call never arrives at WCD 110. This can happen, for instance, because of network congestion, WCD 110 being out of wireless coverage, or WCD 110 being turned off. On the other hand, the incoming call may be successfully delivered to WCD 110, but the user of WCD 110 may fail to answer the call. This can also happen for many reasons, such as WCD 110's incoming call indicator (e.g., a ringer) being turned off, the user of WCD 110 not perceiving the incoming call indicator, or the user of WCD 110 ignoring the incoming call indicator.

Regardless of the reason that WCD 110 missed the call, BSC/MSC 130 detects that WCD 110 has not answered the incoming call and therefore, at step 230, determines that WCD 110 has missed the incoming call. Responsively, at step 235, BSC/MSC 130 forwards the incoming call to message storage system 140, which, at step 240, preferably allows originator 210 to record a message for WCD 110. In some situations, such as when WCD 110 is turned off, BSC/MSC 130 may skip steps 225 and 230, and instead responsively forward the incoming call to message storage system 140.

At step 245, BSC/MSC 130 waits a period of time for message storage system 140 to transmit a signal in response to the message left by originator 210. If BSC/MSC 130 does not receive such a signal within the period of time, then, at step 250, BSC/MSC 130 transmits a message waiting query to message storage system. Preferably, BSC/MSC 130 transmits this message waiting query without prompting from WCD 110. The period of time may be pre-defined or dynamically determined. Furthermore, the period of time may also be fixed or configurable within a range of values. At step 255, message storage system 140 responds with a signal indicating that message storage system 140 is storing a message on behalf of WCD 110. This signal may take many forms. For example, the signal may define an MWI, or the signal may comprise a Boolean indication that the message was left by originator 210.

At step 260, BSC/MSC 130 transmits an MWI to WCD 110. For instance, the signal received at step 255 was an MWI, then BSC/MSC 130 preferably forwards this MWI to WCD 110. Alternatively, if the signal received at step 255 was some other representation, such as a Boolean indication, then BSC/MSC 130 may generate an appropriate MWI and transmit this MWI to WCD 110.

As an alternate embodiment not explicitly shown in FIG. 2, BSC/MSC 130 may contain a missed call counter for WCD 110. When, at step 230, BSC/MSC 130 determines that WCD 110 has missed a call, BSC/MSC may increment its missed call counter for WCD 110. Also, before transmitting the message waiting query at step 250, MSC/MSC 130 may check its missed call counter for WCD 110 and only transmit this query if the missed call counter for WCD 110 is greater than zero. Finally, after step 260, BSC/MSC 130 may determine WCD 110 has received the MWI. For example BSC/MSC 130 may receive an indication from WCD 110 acknowledging a message containing the MWI. Then, BSC/MSC 130 preferably resets its missed call counter for WCD 110 to zero.

Example call flow 200 is a high-level representation. An implementation of such a call flow may include other network elements and networks not shown in FIG. 2. Furthermore, such an implementation may comprise more or fewer messages and/or processing steps, and these steps may be performed in a different order than presented in FIG. 2.

Figure 3:
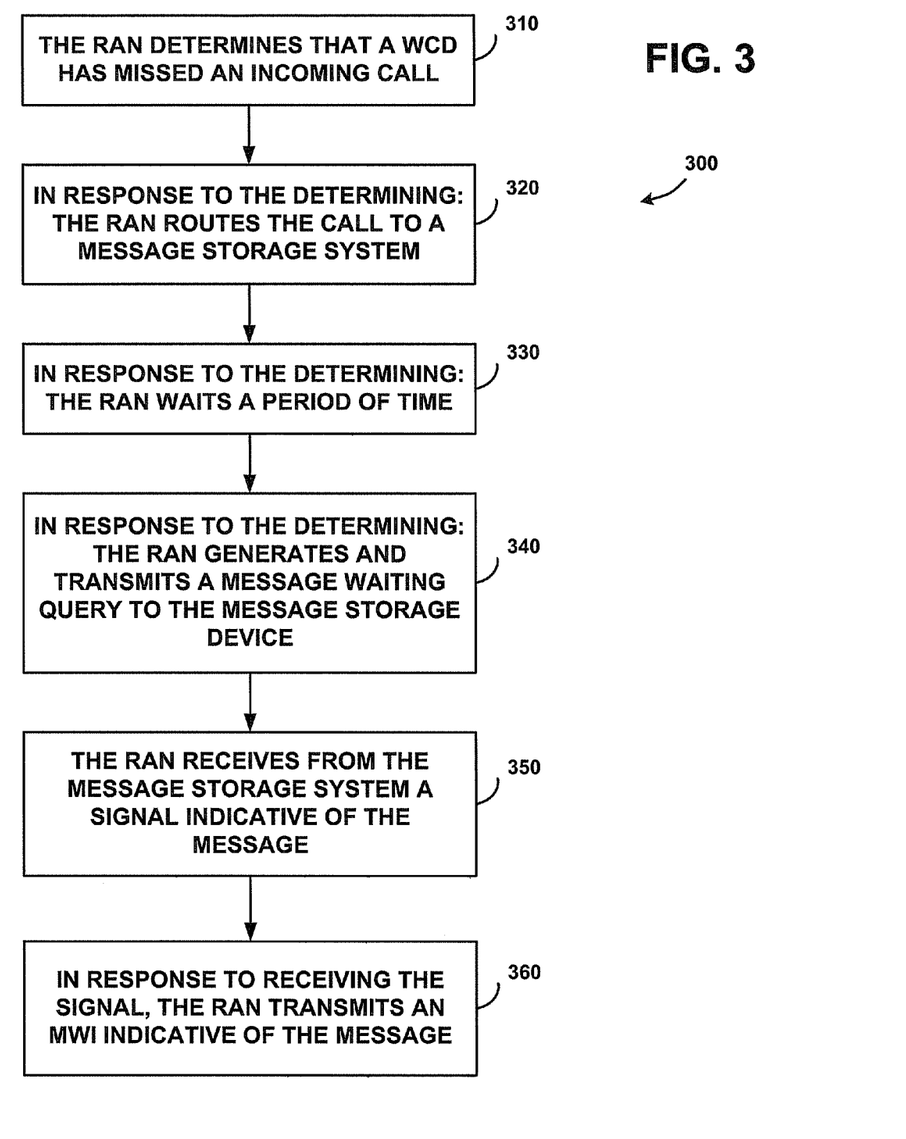
FIG. 3 depicts a method for a RAN element to forward a missed call to a message storage system, a message being left in the message storage system, and the RAN element subsequently triggering the transmission of an MWI to the intended recipient of the message.

FIG. 3 illustrates a method 300, preferably performed by the RAN, or an element of the RAN such as BSC/MSC 130, during at least part of call flow 200. At step 310, the RAN determines that a WCD, such as WCD 110, has missed an incoming call from an originator. The WCD may have missed this call for any of the reasons described above, for instance. At step 320, responsive to this determining, the RAN routes the call to a message storage system, such as message storage system 140. Preferably, the message storage system allows the originator to record a message for the WCD. At step 330, also in response to the determining, the RAN waits for a period of time. As described above, this period of time can be pre-defined or dynamically determined, and fixed or configurable. At step 340, also in response to the determining, the RAN generates a message waiting query and transmits it to the message storage system.

At step 350, the RAN receives, from the message storage system, a signal indicative of the message. As described above, this signal can take many forms, including the form of an MWI or a Boolean indication of the message stored for the WCD. At step 360, in response to receiving the signal, the RAN transmits an MWI indicative of the message to the WCD. For instance, if the signal received from the message storage system is an MWI, the RAN may forward this MWI to the WCD. Alternatively, the RAN may generate the MWI based on the signal. Since a WCD may be simultaneously served by multiple wireless coverage areas, the RAN may forward the MWI to the WCD via one, several, or all of these wireless coverage areas.

Method 300 is illustrative in nature and may comprise more or fewer steps, and these steps may be performed in a different order, or in conjunction with steps of other methods.

III. MWI Delivery to a WCD

As described in the previous section, an MWI may be delivered to a WCD using a page request message. One purpose for paging a WCD, such as WCD 110, with a page request message is to notify the WCD of an incoming session. The session may be, for example, a voice call, a multimedia call, or data communication. Another purpose for paging the WCD is to deliver an MWI to the WCD, where the MWI may be transported in the page request message.

Typically, a RAN pages a WCD by transmitting one or more page request messages on a paging channel. The paging channel is an air interface channel used for paging functions, and is associated with the carrier frequency of its wireless coverage area. The RAN may support one or more paging channels per wireless coverage area. Each paging channel may be divided, via time division multiplexing, into a number of time slots, in some of which the RAN can transmit a page request message to a particular WCD.

When the WCD receives a page request message, it will normally respond to the RAN with a page response message on an access channel, which is another type of channel preferably supported by the air interface. After the RAN receives the page response message from the WCD, the RAN preferably affirms the receipt of the page response message by transmitting a base station acknowledgement message to the WCD on the paging channel. By receiving a page response message from a WCD, the RAN may conclude that the WCD has received the associated page request message. If the page request message contained an MWI, the RAN may also determine that the WCD has received the MWI as well.

From time to time, messages transmitted between the RAN and WCD will fail to reach their destination. When such a failure happens, the RAN may try re-paging the WCD by transmitting another page request after waiting a period of time. This period of time is referred to as a timeout value and it may be configured in the RAN. Furthermore, the RAN may also be configured with a maximum transmissions parameter also associated with page request messages. Once the RAN has transmitted to a given WCD a number of consecutive page request messages equal to the maximum transmissions parameter value, and all of these page request messages have timed out, the RAN may cease attempting to page to the WCD, at least for a while.

Given that paging is a critical activity in the RAN and is potentially resource intensive, it is desirable for the RAN to control the frequency and number of page request messages it transmits. As such, the RAN may define and maintain two sets of parameters associated with transmission of page request messages to a WCD. The first set of parameters is preferably associated with transmitting a page request message for the purpose of transporting an MWI to the WCD. The second set of parameters is preferably associated with transmitting a page request message for a purpose other than transporting an MWI to the WCD (e.g., for waking up the WCD from an idle state to receive an incoming call). Both sets of parameters preferably include timeout and maximum retransmissions parameter governing the transmission of page request messages.

By supporting these two sets of parameters, the operator of a network such as network 100 may adjust the parameters associated with MWI transmission to be different than the parameters associated with typical page request transmission. For example, the operator may set the timeout value and maximum transmissions value for MWI transmission to be higher than that of typical page request messages. This way, a WCD that is temporarily out of coverage has a better chance of receiving the MWI, while paging channel resource usage is spread out over a longer period of time. On the other hand, the operator may set the timeout value and maximum transmissions value for MWI transmissions to be lower than that of typical page request messages, or the operator may set one of these parameters to a value higher and the other parameters to a value lower than values associated with typical page request messages.

Figure 4:
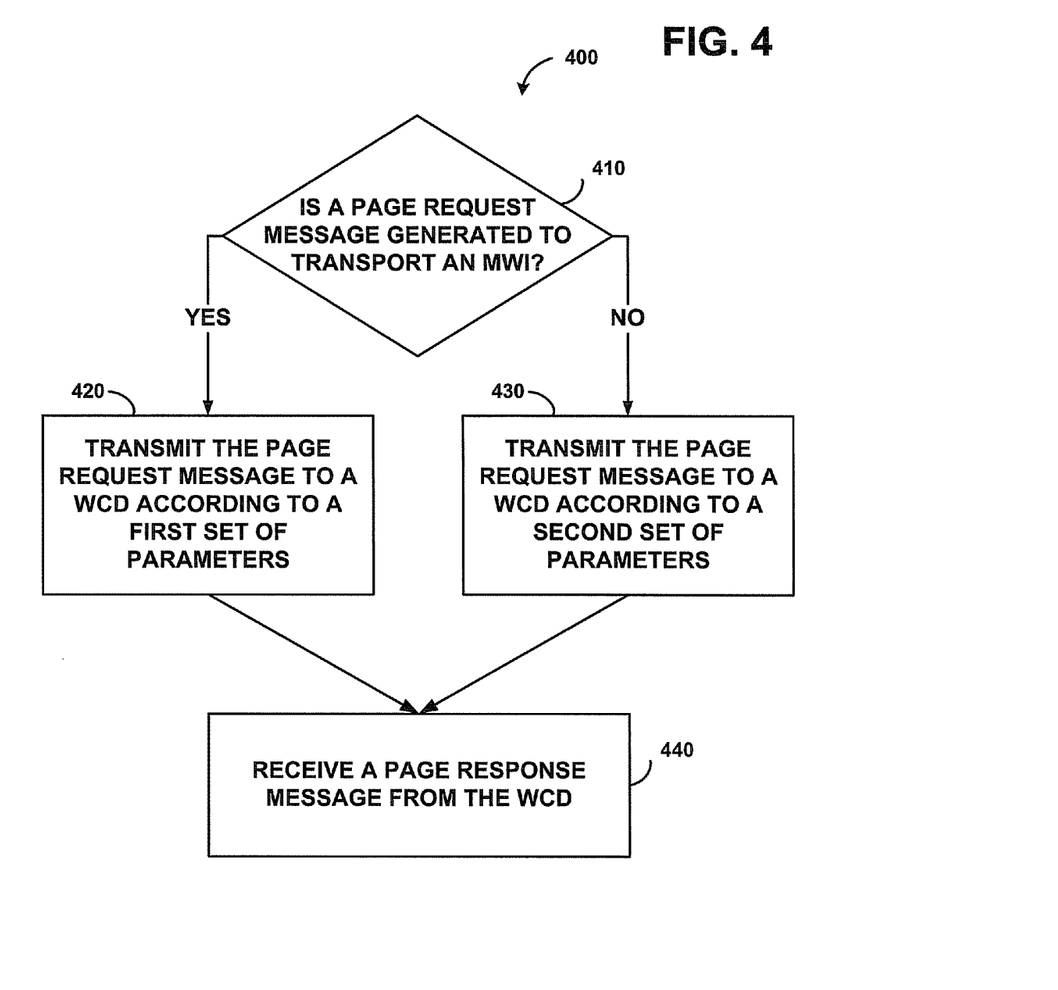
FIG. 4 depicts a method for a RAN element to determine parameters to use for a page request message retransmission, where a page request message can be used to transport an MWI to a WCD.

Accordingly, FIG. 4 illustrates method 400 for transmitting a page request message to a WCD, such as WCD 110. Preferably, this method occurs after method 300, but method 400 may also occur at other times. At step 410, the RAN determines if the page request message is being generated to transport an MWI. If this is the case, then, at step 420, the RAN transmits the page request message to the WCD according to the first set of parameters. However, if this is not the case, then, at step 430, the RAN transmits the page request message to the WCD according to the second set of parameters. After the RAN transmits at least one page request message, then, at step 440, the WCD preferably responds with a page response message, confirming that the WCD has received the page request message. If the page request message transported an MWI, then when the RAN receives a page response message it may then determine that the WCD has received the MWI.

Method 400 is illustrative in nature and may comprise more or fewer steps, and these steps may be performed in a different order, or in conjunction with steps of other methods, such as method 300.

IV. Example RAN Element

Figure 5:
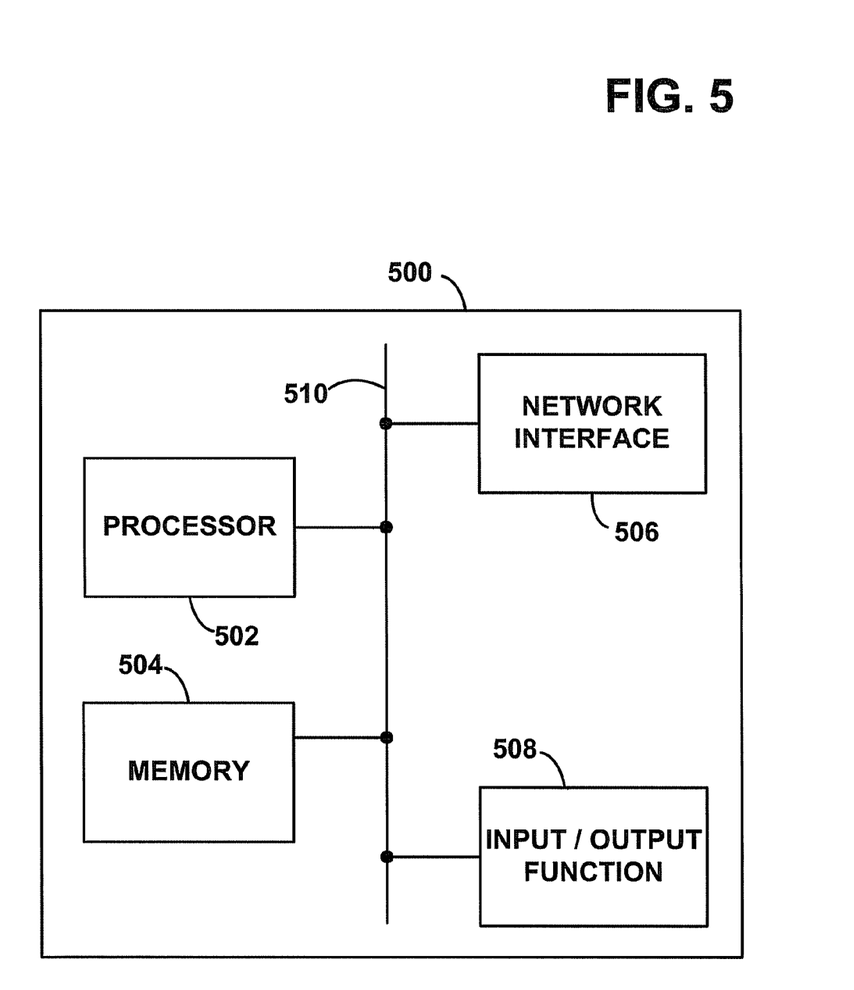
FIG. 5 depicts an exemplary implementation of a RAN element arranged to support the embodiments described herein.

FIG. 5 is a simplified block diagram of an example RAN element 500, illustrating some of the functional components that would likely be found in a RAN element arranged to operate in accordance with the embodiments herein. Example RAN element 500 could be a device in the RAN, such as BTS 120, BSC/MSC 130, or any other device that performs call routing functions. However, example RAN element 500 can take other forms as well. Example RAN element 500 preferably includes a processor 502, a memory 504, a network interface 506, and an input/output function 508, all of which may be coupled by a system bus 510 or a similar mechanism.

Processor 502 preferably includes one or more CPUs, such as one or more general purpose processors and/or one or more dedicated processors (e.g., application specific integrated circuits (ASICs) or digital signal processors (DSPs), etc.) Memory 504, in turn, may comprise volatile and/or non-volatile memory and can be integrated in whole or in part with processor 502. Memory 504 preferably holds program instructions executable by processor 502, and data that is manipulated by these instructions, to carry out various logic functions described herein. (Alternatively, the logic functions can be defined by hardware, firmware, and/or any combination of hardware, firmware and software.)

Network interface 506 may take the form of a wireline connection, such as an Ethernet, Token Ring, or T1 carrier connection. Network interface 506 may also take the form of a wireless connection, such as IEEE 802.11 (Wifi), Bluetooth, or an interface used to communicate with WCDs. However, other forms of physical layer connections and other types of standard or proprietary communication protocols may be used over network interface 506

Input/output function 508 facilitates user interaction with example RAN element 500. Input/output function 508 may comprise multiple types of input devices, such as a keyboard, a mouse, a touch screen, and so on. Similarly, input/output function 508 may comprise multiple types of output devices, such as a monitor, printer, or one or more light emitting diodes (LEDs). Additionally or alternatively, example RAN element 500 may support remote access from another device, via network interface 506 or via another interface (not shown), such an RS-232 port.

By way of example, the data in memory 504 will preferably contain information associated with WCDs, such as WCD 110, served by the RAN's wireless coverage areas. This information may include identifiers of the WCDs, such as the WCDs' International Mobile Subscriber Identities, Electronic Serial Numbers, and so on. Memory 504 may also contain a timer for determining how long to wait after forwarding an incoming call to a message storage system before transmitting a message waiting query to the message storage system. Memory 504 may additionally contain a first and a second set of parameters associated with transmitting page request messages to a WCD. Moreover, memory 504 may also contain a missed call counter for one or more WCDs served by the RAN.

Furthermore, memory 504 may also contain machine logic, preferably in the form of program instructions executable by processor 502, to perform at least some aspects of call flow 200, as well as the steps of methods 300 and 400. Thus, the machine logic may support determining that a WCD has missed an incoming call, and responsively: (i) routing the call to a message storage system, such as message storage system 140, to enable an originator of the call to leave a message for a user of the WCD, (ii) waiting a period of time after routing the call to the message storage system, and (iii) then generating and transmitting a message waiting query to the message storage system without prompting from the WCD.

Memory 504 may contain additional machine logic for receiving from the message storage system, in response to the message waiting query, a signal indicative of the message. The machine logic may also, response to receiving the signal, support transmitting to the WCD a message waiting indication (MWI) indicative of the message, for presentation of the MWI to the user of the WCD.

Memory 504 may also contain machine logic for incrementing a missed call counter for a WCD upon determining that that WCD has missed a call. Further, the machine logic may check the value of the WCD's missed call counter before transmitting a message waiting query to the WCD, and only transmit the message waiting query if the missed call counter exceeds zero. Even further, the machine logic may, in response to the RAN determining that the WCD has received the MWI, reset the missed call counter to zero.

Finally, memory 504 may contain machine logic to support transmitting page request messages to a WCD in accordance with a first and a second set of parameters, where the sets of parameters define timeout and retransmission behavior of the RAN with respect to these page request messages.

The machine logic functions of memory 504 described above are exemplary and not intended to be a complete description of the functions stored in memory 504, or of the functions supported by RAN element 500. RAN element 500 may support other functions related to performing tasks associated with RAN procedures, and these additional functions are preferably encoded as machine logic and stored in memory 504.

V. Conclusion

Exemplary embodiments have been described above. Those skilled in the art will understand, however, that changes and modifications may be made to these embodiments without departing from the true scope and spirit of the invention, which is defined by the claims.

What is claimed is:

1. In a radio access network (RAN) that defines at least one wireless coverage area in which the RAN serves at least one wireless communication device (WCD), a method for managing message waiting notification, the method comprising:
the RAN determining that the WCD has missed an incoming call;
in response to determining that the WCD has missed the incoming call, (i) the RAN routing the call to a message storage system to enable an originator of the call to leave a message for a user of the WCD, (ii) in response to (a) the RAN waiting a period of time after routing the call to the message storage system, and (b) the RAN determining that, since routing the call to the message storage system, no message waiting indication (MWI) has been transmitted to the WCD and the WCD has not prompted the RAN to query the message storage system, the RAN generating and transmitting a message waiting query to the message storage system to trigger the message storage system to transmit a signal indicative of the MWI to the WCD;
the RAN receiving from the message storage system, in response to the message waiting query, the signal; and
in response to receiving the signal, the RAN transmitting to the WCD an MWI indicative of the message, for presentation of the MWI to the user of the WCD.

2. The method of claim 1, wherein the signal defines the MWI, and wherein transmitting the MWI to the WCD comprises forwarding the signal to the WCD.

3. The method of claim 1, wherein the signal comprises a Boolean indication that the message was left by the originator of the call, and wherein transmitting the MWI to the WCD comprises generating the MWI in response to at least the Boolean indication, and transmitting the generated MWI to the WCD.

4. The method of claim 1, where the RAN determining that the WCD has missed the incoming call comprises:
the RAN receiving a request to set up the incoming call to the WCD; and
the RAN then failing to successfully set up the incoming call to the WCD.

5. The method of claim 4, wherein failing to successfully set up the incoming call to the WCD comprises attempting and failing to set up the incoming call to the WCD.

6. The method of claim 4, wherein failing to successfully set up the incoming call to the WCD comprises determining that the WCD is unable to receive the incoming call.

7. The method of claim 1, wherein the RAN serves the WCD via multiple wireless coverage areas, and wherein the RAN transmitting to the WCD the MWI comprises the RAN transmitting the MWI to the WCD via each of the multiple wireless coverage areas serving the WCD.

8. The method of claim 1, further comprising:
determining, at the end of the period of time after routing the call to the message storage system, that the RAN has not received the signal from the message storage system.

9. The method of claim 1, further comprising:
the RAN maintaining a missed call counter for the WCD; and
in response to determining that the WCD has missed the incoming call, incrementing the missed call counter, wherein the RAN generates and transmits the message waiting query in response to determining that the missed call counter for the WCD exceeds zero.

10. The method of claim 9, further comprising:
the RAN determining that the WCD has received the MWI; and
in response to determining that the WCD has received the MWI, the RAN resetting the missed call counter to zero.

11. The method of claim 1, wherein the RAN transmitting to the WCD the MWI comprises the RAN transmitting the MWI in a page request message to the WCD, wherein the RAN supports a first type of page request message that is generated for a purpose of transporting the MWI, and wherein the RAN supports a second type of page request message that is generated for a purpose other than transporting the MWI, the method further comprising:
maintaining, in the RAN, a first set of parameters associated with the first type of page request message; and
maintaining, in the RAN, a second set of parameters associated with the second type of page request message.

12. The method of claim 11, wherein the first set of parameters and the second set of parameters both include: (i) a timeout parameter that establishes how long the RAN will wait to receive a page response message from the WCD before once again transmitting the page request message, and (ii) a maximum transmissions parameter that establishes a number of times the page request message will be transmitted to the WCD, each transmission being in response to a timeout of a previous transmission of the page request message.

13. The method of claim 1, wherein the message storage system is at least one of a voicemail storage system and a video-mail storage system.

14. A system comprising:
a wireless communication device (WCD), capable of receiving an incoming call;
a message storage system containing:
a message storage system central processing unit (CPU);
a message storage system memory to store a message left for a user of the WCD by an originator of the incoming call; and
machine logic stored in the message storage system memory and executable by the message storage system CPU to (i) receive the incoming call, (ii) record, in the message storage system memory, the message, and (iii) respond to a message waiting query with a signal indicative of a message waiting indication (MWI); and
a radio access network (RAN) defining at least one wireless coverage area that serves the WCD, wherein the RAN comprises:
a RAN CPU;
a RAN memory;
machine logic stored in the RAN memory and executable by the RAN CPU to:
determine that the WCD has missed the incoming call;
in response to the determining that the WCD has missed the incoming call, (i) route the incoming call to the message storage system, (ii) in response to (a) waiting a period of time after routing the incoming call to the message storage system, and (b) determining that, since routing the incoming call to the message storage system, no MWI has been transmitted to the WCD and the WCD has not prompted the RAN to query the message storage system, generate and transmit the message waiting query to the message storage system to trigger the message storage system to transmit the signal to the WCD;

receive from the message storage system, in response to the message waiting query, the signal indicative of the message; and in response to the signal, transmit the MWI to the WCD, for presentation of the MWI to the user of the WCD.

15. The system of claim 14, wherein the signal is the MWI.

16. The system of claim 14, wherein the RAN further comprises:

machine logic stored in the RAN memory and executable by the RAN CPU to generate a page request message and transmit the page request message to the WCD;

a first set of parameters stored in the RAN memory and associated with a first type of page request message, wherein the RAN generates the first type of page request message for a purpose of transporting the MWI to the WCD; and a second set of parameters stored in the RAN memory and associated with the second type of page request message, wherein the RAN generates the second type of page request message for a purpose of transmitting information other than the MWI to the WCD.

17. The system of claim 16, wherein the first set of parameters and the second set of parameters both include: (i) a timeout parameter that establishes how long the RAN will wait to receive a page response message from the WCD before once again transmitting the page request message, and (ii) a maximum transmissions parameter that establishes a number of times the page request message will be transmitted to the WCD, each transmission being in response to a timeout of a previous transmission of the page request message.

18. The system of claim 14, wherein the RAN further comprises:

a missed call counter, stored in RAN memory and associated with the WCD; and machine logic stored in the RAN memory and executable by the RAN CPU to (i) increment the missed call counter in response to detecting the missed call, (ii) trigger generating and transmitting the message waiting query when the missed call counter is determined to be greater than zero, and (iii) set the missed call counter to zero upon determining that the WCD has received the MWI.

19. The system of claim 14, wherein the message storage system is at least one of a voicemail storage system and a video-mail storage system.

* * * * *